(12) United States Patent
Mortimer et al.

(10) Patent No.: US 8,004,217 B2
(45) Date of Patent: Aug. 23, 2011

(54) ELECTRONIC BALLAST WITH INTEGRAL SHUTDOWN TIMER

(75) Inventors: George William Mortimer, Park Forest, IL (US); Robert William Wisbey, Mundelein, IL (US)

(73) Assignee: Robertson Worldwide, Inc., Blue Island, IL (US)

( * ) Notice: Subject to any disclaimer, the term of this patent is extended or adjusted under 35 U.S.C. 154(b) by 434 days.

(21) Appl. No.: 12/013,247

(22) Filed: Jan. 11, 2008

(65) Prior Publication Data

US 2009/0179598 A1    Jul. 16, 2009

(51) Int. Cl.
*H05B 37/02* (2006.01)
(52) U.S. Cl. .................... 315/360; 315/119; 315/224
(58) Field of Classification Search .......... 315/360, 315/307, 308, 291, 224, 225, 119, 127, 128, 315/123, 125
See application file for complete search history.

(56) References Cited

U.S. PATENT DOCUMENTS

| | | | |
|---|---|---|---|
| 4,503,363 A | 3/1985 | Nilssen | |
| 4,616,316 A | 10/1986 | Hanpeter et al. | |
| 4,888,544 A | 12/1989 | Terry et al. | |
| 5,089,753 A * | 2/1992 | Mattas | 315/324 |
| 5,262,699 A | 11/1993 | Sun et al. | |
| 5,378,254 A | 1/1995 | Maly et al. | |
| 5,475,284 A | 12/1995 | Lester et al. | |
| 5,635,799 A | 6/1997 | Hesterman | |
| 5,744,912 A | 4/1998 | So | |
| 5,757,141 A * | 5/1998 | Wood | 315/224 |
| 5,764,144 A | 6/1998 | Falkiner et al. | |
| 5,789,868 A | 8/1998 | Sears | |
| 6,018,220 A | 1/2000 | Nerone | |
| 6,111,363 A | 8/2000 | Nerone | |
| 6,118,228 A | 9/2000 | Pál | |
| 6,366,032 B1 | 4/2002 | Allison et al. | |
| 6,420,838 B1 | 7/2002 | Shackle | |
| 6,791,275 B2 | 9/2004 | Shackle | |

FOREIGN PATENT DOCUMENTS

| | | |
|---|---|---|
| WO | 83/02901 | 9/1983 |
| WO | 2006/078396 | 7/2006 |

OTHER PUBLICATIONS http://www.onsemi.com/pub/Collateral/MC14521B-D—visited on or about Aug. 27, 2007.
http://www.geocities.com/CapeCanaveral/Lab/5185/circuit2.html#LONG—currently visited and printed on Apr. 10, 2008, but was available on or about Nov. 14, 2007.

* cited by examiner

*Primary Examiner* — David Hung Vu
(74) *Attorney, Agent, or Firm* — Ungaretti & Harris LLP

(57) ABSTRACT

The present invention provides, in one embodiment, a gas discharge lamp ballast with an integral shutdown timer. The ballast includes a circuit for receiving AC power, a converter circuit for converting the AC power to DC power and a square wave oscillator powered from the DC power. A resonant circuit powered by the square wave oscillator supplies power to at least one gas discharge lamp. A time-delay circuit disables the square wave oscillator, without interrupting the DC power supplied to the oscillator, upon the passage of a predetermined period of time from power-up of the AC power. The ballast can be realized with only a marginal increase in cost and size of the ballast.

22 Claims, 6 Drawing Sheets

ELECTRONIC BALLAST WITH INTEGRAL SHUTDOWN TIMER

FIELD OF THE INVENTION

The present invention relates to electronic ballasts for fluorescent lamps. More particularly, the present invention relates to fluorescent lamp ballasts including integral circuitry for turning off the lamp after a predetermined period of time has elapsed.

BACKGROUND OF THE INVENTION

Electronically-ballasted fluorescent lamps are often used as task lighting in office environments. Normally, in these applications the task lights are mounted in workstation furniture and are turned on by the user at the beginning of the day. The problem with this arrangement is that often the user forgets to turn the task lamps off at the end of the day, thus eliminating a large percentage of the energy savings from using a fluorescent lamp due to the lamp remaining on all night.

Previously, manufacturers have used mechanical or electronic timers in line between the power source and the light fixture in order to interrupt power to the light fixture after a specified time. Drawbacks of this approach include the significant added expense of a separate timing circuit. Additionally, such prior art solution also requires a significant volume to implement the circuitry required to interrupt the primary power to the fixture.

It would, therefore, be desirable to provide an electronic fluorescent lamp ballast with an integral timer feature that will allow the lamp to operate for a predetermined length of time and then shut the lamp off. It would be desirable for such timer feature to add only a marginal increase in cost and size of the lamp ballast.

BRIEF SUMMARY OF THE INVENTION

The present invention provides, in one embodiment, a gas discharge lamp ballast with an integral shutdown timer. The ballast includes a circuit for receiving AC power, a converter circuit for converting the AC power to DC power and a square wave oscillator powered from the DC power. A resonant circuit powered by the square wave oscillator supplies power to at least one gas discharge lamp. A time-delay circuit disables the square wave oscillator, without interrupting the DC power supplied to the oscillator, upon the passage of a predetermined period of time from power-up of the AC power.

The foregoing ballast beneficially allows a gas discharge lamp to operate for a predetermined length of time and then shuts off the lamp. The ballast can be realized with only a marginal increase in cost and size of the ballast.

BRIEF DESCRIPTION OF THE DRAWINGS

In the drawings, in which like reference numerals refer to like parts.

DETAILED DESCRIPTION OF THE PREFERRED EMBODIMENTS

Figure 1:
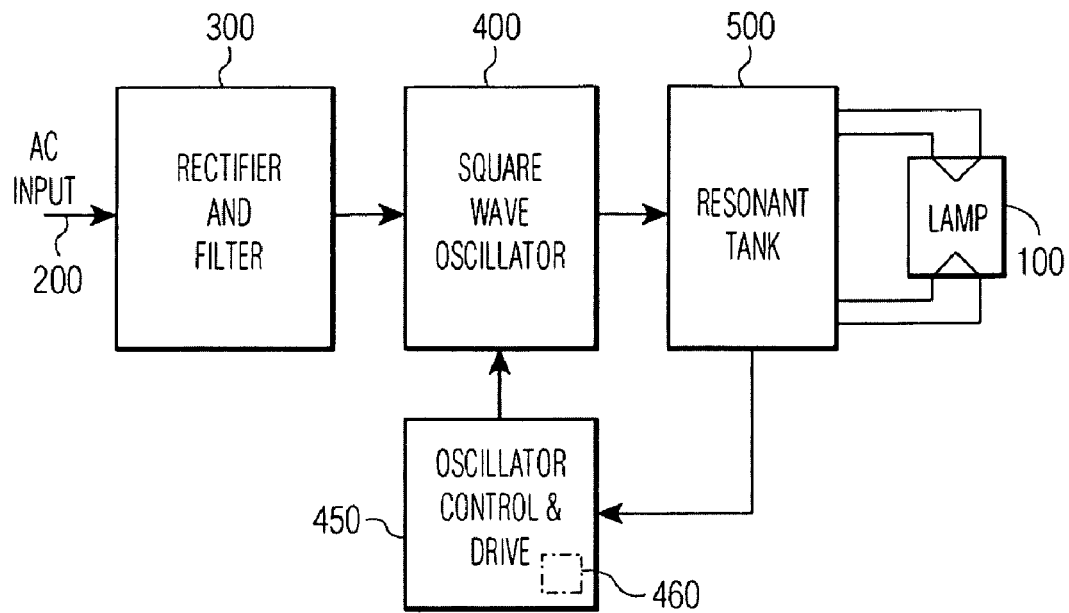
FIG. 1 is a block diagram of a prior art ballast for a fluorescent lamp.
Figure 2:
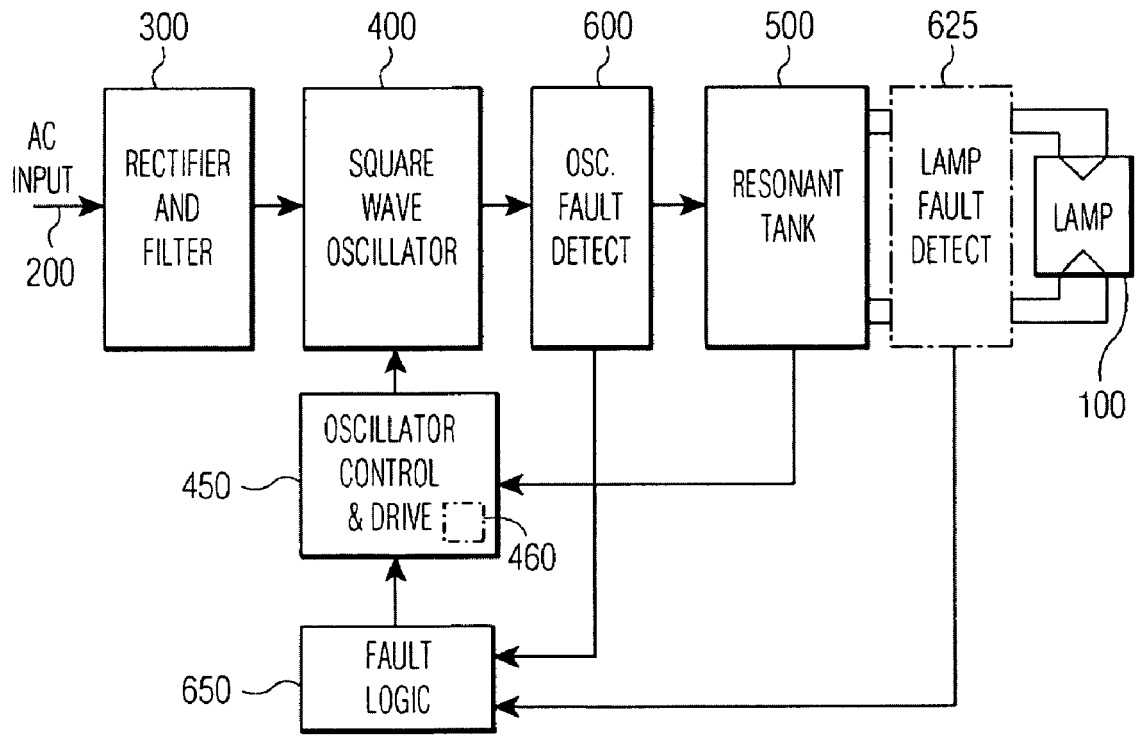
FIG. 2 is block diagram of another prior art ballast for a fluorescent lamp.
Figure 3:
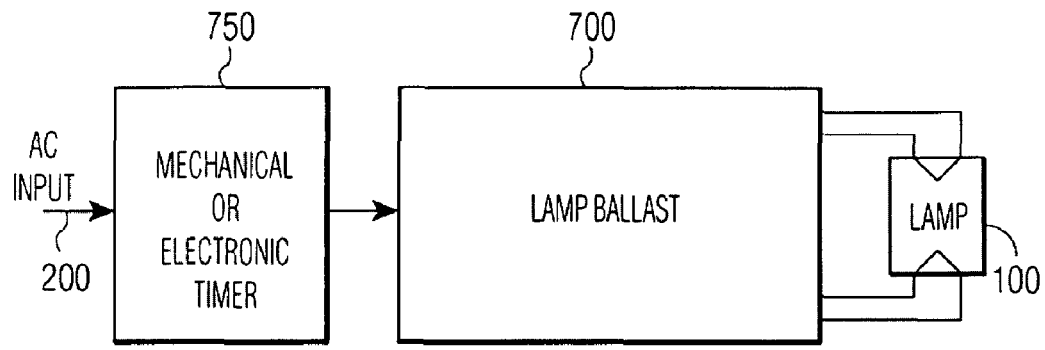
FIG. 3 is a block diagram of a further prior art circuit using a mechanical or electronic timer positioned between an AC input and a lamp ballast.

FIGS. 1-3 show various prior art electronic ballasts, so as to provide a better perspective for understanding the present invention. FIGS. 1-2 show ballasts that can benefit from the timer feature of the present invention, while FIG. 3 shows a prior art approach which includes a timer function with a ballast and over which the present invention improves.

A list of list of reference numerals and associated parts appears near the end of this description for the convenience of the reader.

FIG. 1 shows a prior art ballast for a fluorescent lamp 100, which receives AC input power as noted by arrow 200. Lamp 100 may have two-terminal heated filaments as shown. A rectifier and filter circuit 300 receives the AC input power and, in turn, provides DC power to a square wave oscillator 400, which may comprise a half-bridge circuit formed with a pair of serially connected switching transistors in a totem-pole arrangement. Alternatively, square wave oscillator may comprise a push-pull circuit of parallel resonant design. A resonant tank 500, typically including a resonant capacitance and resonant inductance, supplies AC voltage to lamp 100.

Resonant tank 500 typically provides a feedback signal, such as from a winding (not shown) coupled to the resonant inductance or from a separate feedback transformer, to an oscillator control and drive circuit 450. Oscillator control and drive circuit 450 then controls and drives square wave oscillator 400 in a manner to start and then run lamp 100. As an alternative to using the foregoing feedback winding and corresponding implementation of oscillator control and drive circuit 450, an integrated control circuit 460 can be incorporated in oscillator control and drive circuit 450. U.S. Pat. No. 6,366,032 to Allison et al. describes one such integrated control circuit that can be used.

FIG. 2 shows another prior art ballast for a fluorescent lamp 100. The ballast of FIG. 2 has parts with the same reference numerals as in FIG. 1, and since the likeness of reference numerals refers to likeness of parts, the reader can consult the earlier description of such parts for part description.

The fluorescent lamp ballast of FIG. 2 adds to the ballast of FIG. 1 either an oscillator fault detection circuit 600 or a lamp fault detection circuit 625 (shown in phantom). A fault logic circuit 650 responds to fault signals from either of the oscillator fault detection circuit 600 or the lamp fault detection circuit 625, and responsively provides a control signal to oscillator control and drive circuit 450.

As mentioned above, either of the electronic ballasts of FIGS. 1-2 can benefit from the timer feature of the present invention.

FIG. 3 shows a prior art circuit using a timer function over which the present invention improves. Lamp ballast 700 can be realized by various circuits including those shown in FIGS. 1-2. This prior art approach interposes a mechanical or electrical timer 750 in the power line between AC input power 200 and lamp ballast 700. One key disadvantage of such a solution to providing a timer function is that a separate mechanical or electrical timer 750 must be used. It, would, therefore be desirable to eliminate the need for a separate mechanical or electrical timer 750.

Figure 4:
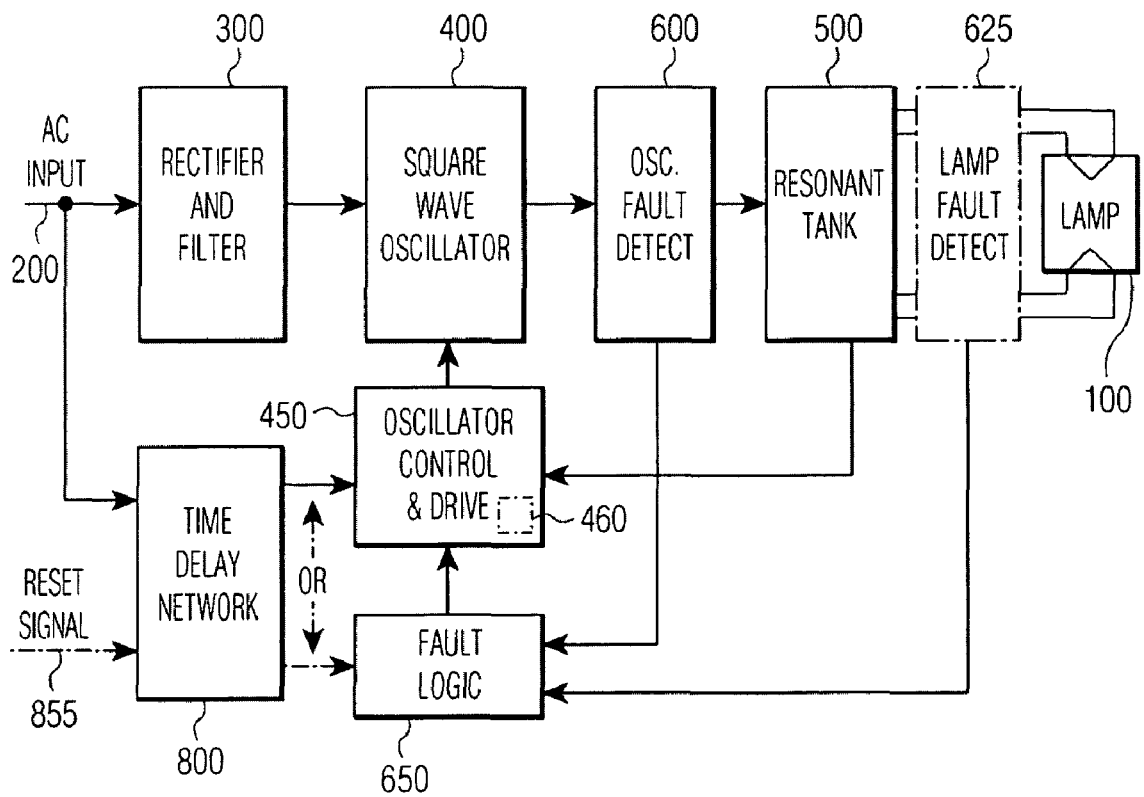
FIG. 4 is a block diagram of a fluorescent lamp ballast, which includes a timer function in accordance with an aspect of the present invention.

FIG. 4 shows application of various embodiments of the present invention to the prior art circuit of FIG. 1 or FIG. 2. In FIG. 4, a time delay network 800 in accordance with the invention receives either a signal representing AC power 200, or, alternatively, receives a reset signal 855. In response to whichever of the foregoing signals is received, time delay network 800 provides an output signal to control either oscillator control and drive circuit 450 or fault logic circuit 650.

Reset signal 855 is shown associated with a phantom line, to indicate that it may typically be used instead of using the input from a signal representing AC power 200, or only the signal representing AC power 200 may be used. Similarly, the output from time delay network 800 leading to fault logic circuit 650 is shown in phantom to indicate that it may typically be used instead of the output of the time delay circuit leading to oscillator control and drive circuit 450, or only the output of the time delay circuit to the oscillator control and drive circuit may be used.

Figure 5:
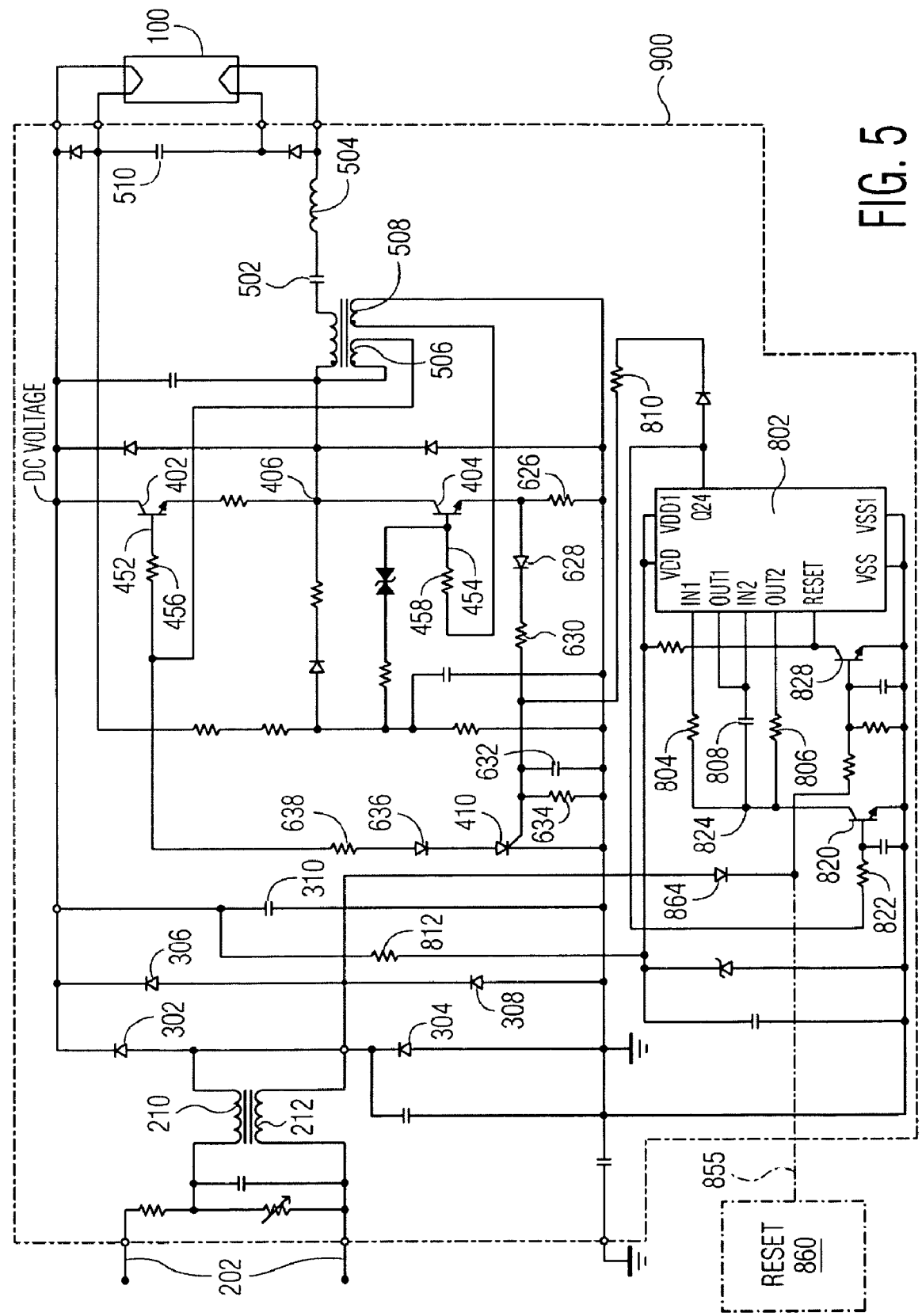
FIG. 5 is a schematic circuit diagram, partially in block form, of one implementation of the ballast of FIG. 4.

FIG. 5 shows a preferred embodiment of a ballast circuit for a fluorescent lamp in accordance with the invention. The previously described square wave oscillator 400 of FIGS. 1-2 is realized by circuitry including a pair of NPN switching transistors 402 and 404 configured in a totem-pole arrangement to alternately switch midpoint connection 406 of the transistors between a DC voltage on the upper-shown node of transistor 402 and the illustrated ground or reference node. NPN switching transistors 402 and 404 may be replaced by other power switching device such as power MOSFETs. A resonant tank circuit includes a DC blocking capacitor 502, a resonant inductor 504, a resonant capacitor 510, and lamp 100. In customary fashion, windings 506 and 508 sample current through the lamp and provide respective feedback signals to control or base nodes 452 and 454 of switching transistors 402 and 404 via resistors 456 and 458. Base nodes 452 and 454 comprise parts of oscillator control and drive circuit 400 of FIGS. 1-2.

In FIG. 5, rectifier and filter 300 of FIGS. 1-2 is realized by circuitry including input inductor 210, a full-bridge rectifier formed of PN diodes 302, 304, 306, and 308, and a bulk filter capacitor 310. Diodes 302-308 could be formed as an integral bridge rectifier assembly. As an alternative to using four diodes 302, 304, 306 and 308 and a single bulk filter capacitor 310, two diodes (not shown) and two series capacitive elements (not shown) could be used to realize a voltage-doubler type of input rectifier and filter circuit. AC input power 200 of FIGS. 1-2 is realized application of AC voltage to input nodes 202.

A lamp fault detection circuit 625 of FIGS. 1-2 is realized in FIG. 5 by a sense resistor 626 in the emitter lead of transistor 404, resistors 630, 634, and 638, capacitor 632, diodes 628 and 636 and SCR 410. This circuit detects excessive current in the oscillator circuit and switches SCR 410 to the ON state, pulling base 452 of transistor 402 to ground and turning off the oscillator.

In FIG. 5, an oscillator control and drive circuit 450 of FIGS. 1-2 is realized by circuitry comprising base drive transformer 506/508 and resistors 456 and 458 connected across the bases 452 and 454 of NPN transistors 402 and 404, respectively. Base drive transformer 506/508 may be realized as separate transformers or as part of inductor 504. This network generates drive signals corresponding to the current through the resonant tank inductor and capacitor and uses regenerative feedback to maintain oscillation of the resonant circuit.

In accordance with as aspect of the invention, time delay network 800 of FIG. 4 is realized by circuitry including a MC14521B 24-stage frequency divider 802 by ON Semiconductor of Phoenix, Ariz. Frequency divider 802 includes a 24-stage chain of flip-flops (not shown) which divide the input frequency by a factor of $2^{24}$. Resistors 804 and 806 and capacitor 808 function as an RC oscillator with a period of approximately 2*(resistance of resistor 804)*(capacitance of capacitor 808) or 4.4 milliseconds in the case of the resistors 804 and 806 having resistances of 210 k-ohms and 105 k-ohms, respectively, and capacitor 808 having a capacitance of 22 nF. This frequency is then divided by frequency divider 802 such that the initiation of the $24^{th}$ stage occurs after $0.0046*2^{23}$ seconds, or approximately 10.2 hours. This 10.2 hours duration approximately represents a standard business day, but the foregoing resistor and capacitor values can be chosen to produce other durations of time for initiation of the $24^{th}$ stage. In any event, such duration would typically be greater than 15 minutes.

Upon initiation of the $24^{th}$ stage in frequency divider 802, output Q24 of frequency divider 802 transitions from low to high, providing a signal through resistor 810 to trigger a shutdown SCR 410, contained in the realization of oscillator control and drive circuit 450 of FIGS. 4-5, so as bring the voltage of base node 452 of the upper transistor 402 low and turn the lamp off. In addition, output Q24 of the frequency divider is connected to a PNP transistor 820 via resistor 822, which pulls the voltage of the common node or tap 824 of the above-mentioned oscillator components low and prevents further operation of the oscillator. This keeps the output node Q24 high, keeping the shutdown SCR 410 triggered, as well as keeping the frequency divider 802 itself locked in that state.

Reset of the time delay network in FIG. 5 corresponding to network 800 of FIG. 4 is caused by turning off AC input power to the ballast. This is sensed by voltage at a filtered power lead 212 of filter inductor 210, which causes base drive to a reset transistor 828 to be removed and allows the "RESET" pin of frequency divider 802 to go high, resetting the logic bits in the frequency divider.

In making the foregoing fluorescent lamp ballast of FIG. 5B, it was decided to move a reset signal for resetting from a node at the ballast bulk voltage labeled "DC VOLTAGE" to the unrectified AC line via filtered power lead 212 of filter inductor 210. Selection of a reset signal from a signal on winding tap 212 representing AC input power, rather than from a signal representing the ballast bulk voltage guarantees that the reset signal will occur before the bulk filter capacitor 306 completes the process of becoming fully discharged. Bias voltage VDD and VDD1 for frequency divider 802 is provided by a tap off the ballast bulk voltage labeled "DC VOLTAGE," via resistor 812. This means that frequency divider 802 will still be fully energized when the reset signal—i.e., AC power being turned off—occurs. Beneficially, this ensures that frequency divider 802 remains powered by the residual charge on the bulk capacitor 306 until after resetting of the frequency divider has occurred. As a result, the frequency divider becomes reset in a reliable manner.

Finally, regarding FIG. 5, a printed-circuit board (PCB) 900 is indicated by phantom-line box 900. All components shown within phantom-line box 900 are preferably mounted directly or indirectly onto PCB 900. By "mounting indirectly" is meant that a component may be mounted on small PCB, for instance, which is, in turn, mounted onto PCB 900.

With reference to FIG. 4, as to which FIG. 5 is an implementation, an alternative to using feedback windings 506/508 of FIG. 5 and associated circuitry for self-resonant control of square wave oscillator can be realized as follows. Oscillator control and drive circuit 450 can incorporate integrated control circuit 460, such as that described in U.S. Pat. No. 6,366,032 to Allison et al.

For a further understanding of the fluorescent lamp ballast of FIG. 5, FIGS. 6A-6E show various timing waveforms for voltages or conditions of that lamp ballast.

Figure 6A:
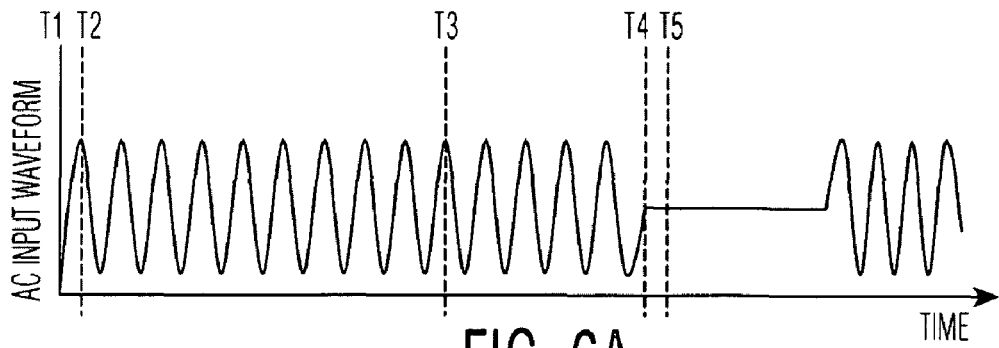
FIGS. 6A-6E are timing diagrams for various voltages or conditions of the ballast of FIG. 5.
Figure 6B:
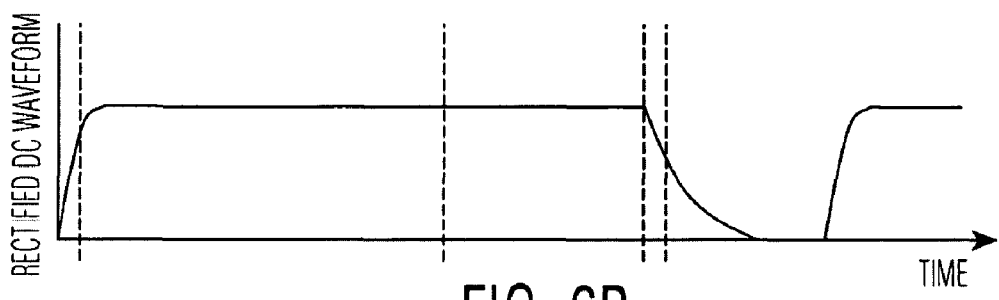
Figure 6C:
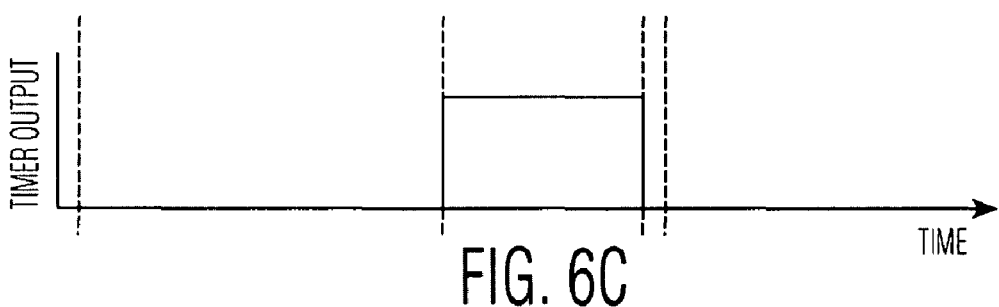
Figure 6D:
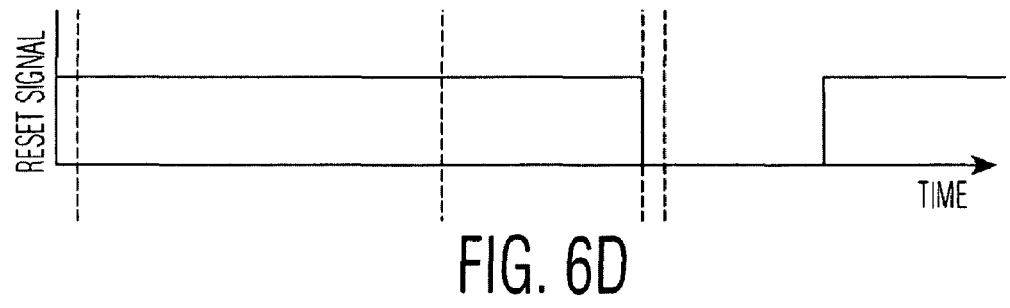

FIG. 6A shows an AC input waveform taken at filtered power lead 212 in FIG. 5; FIG. 6B shows a rectified DC waveform taken at the node labeled "DC VOLTAGE" in FIG. 5; FIG. 6B shows a rectified DC waveform taken at the node labeled "DC VOLTAGE" in FIG. 5; FIG. 6C shows the logic output of pin Q24 of frequency divider 802; FIG. 6D shows a reset signal taken at the RESET pin of frequency divider 802; and FIG. 6E shows the output of lamp 100.

Time points T1-T5 in FIGS. 6A-6E are explained as follows.

T1: AC input power is applied to the ballast.
T2: DC filter bulk capacitor 306 becomes charged up as shown in FIG. 6B and the ballast begins to drive the lamp.
T3: Frequency divider 802 reaches its predetermined shutoff point when its output Q24 goes high as shown in FIG. 6C, causing shutdown SCR 410 to activate and shut down the square wave oscillator 400 (FIG. 4), thus turning off the lamp. Output Q24 remains high as shown in FIG. 6C in order to keep the lamp off and disable frequency divider 802 so as to prevent any further counts in the internal clock of the frequency divider.
T4: The AC input power is turned off. This causes the reset signal of FIG. 6D to go low. This causes frequency divider output Q24 to go low as shown in FIG. 6C, which deactivates shutdown SCR 410 and clears any clock counts in the frequency divider.
T5: Any time after time T5, the ballast can be re-energized from application of AC input power, so that the lamp restarts. However, a short delay is necessary to ensure that the reset signal has transitioned from high to low and the frequency divider has been cleared.

Figure 6E:
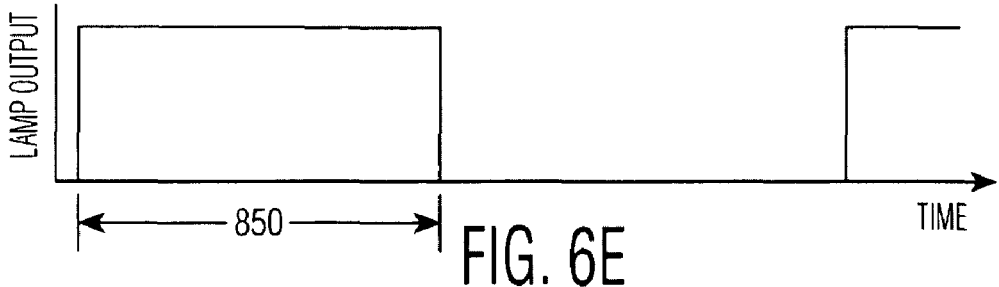

As described above, fluorescent lamp ballast of FIGS. 4-5 allows a user to power up lamp 100 and keep the lamp on for a predetermined period of time, such as approximately 10 hours, and as shown by time interval 850 in FIG. 6E. In an alternative embodiment, a reset circuit 860, shown in phantom, can be connected to realize reset signal 855 of FIG. 4 and apply that signal to the control or base node of reset transistor 828. In this case, the control or base node of reset transistor 828 would no longer be connected to filtered input lead 212, so that PN diode 862 would be eliminated Reset circuit 860 may comprise a toggle switch that switches between high and low logic levels. Power for reset circuit 860 may be supplied from an AC or DC power supply, by way of example. Reset circuit 860 may be embodied as a conventional wall switch or toggle switch such as is standard in the industry.

FIGS. 7A-7E show various timing waveforms for voltages or conditions of the lamp ballast circuit of FIGS. 4-5 when reset circuit 860 is used to reset frequency divider 802. In this case, power-down of the AC input power, as sensed from filtered power lead 212, would typically not be used for resetting frequency divider 802.

Figure 7A:
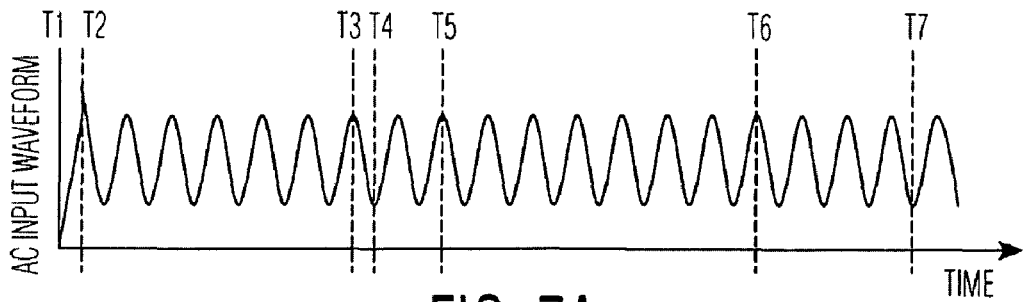
FIGS. 7A-7E are timing diagrams for various voltages or conditions of the ballast of FIG. 5 when utilizing an external reset circuit for the time delay network of that ballast.
Figure 7B:
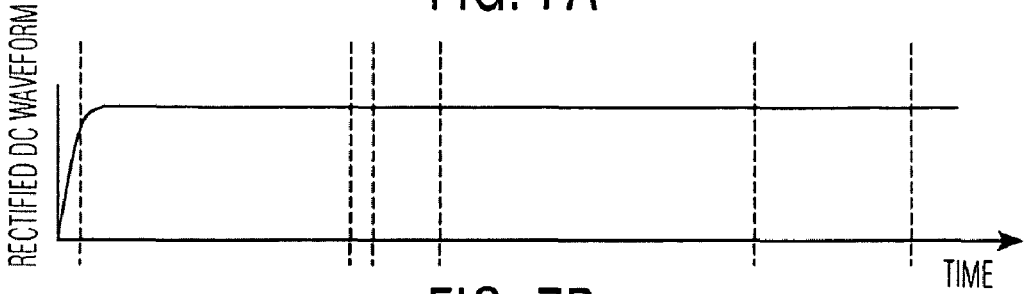
Figure 7C:
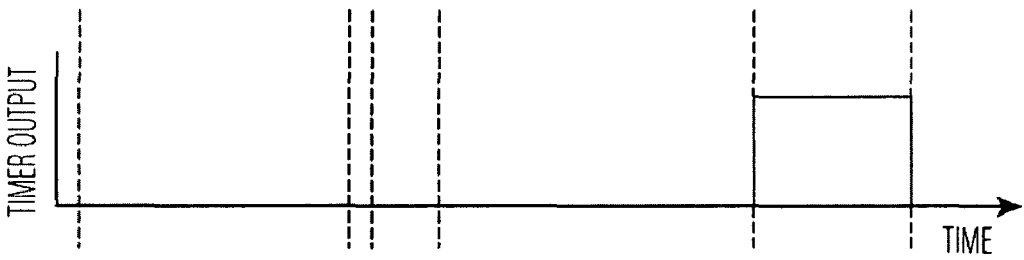
Figure 7D:
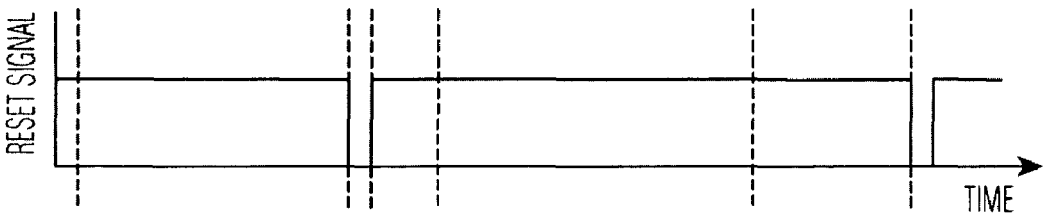
Figure 7E:
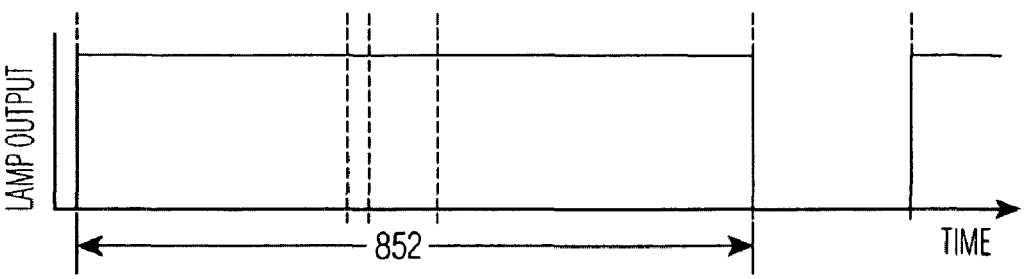

FIG. 7A shows an AC input waveform taken at filtered power lead 212 in FIG. 5; FIG. 7B shows a rectified DC waveform taken at the node labeled "DC VOLTAGE" in FIG. 5; FIG. 7C shows the logic output of pin Q24 of frequency divider 802; FIG. 7D shows a reset signal taken at the RESET pin of frequency divider 802; and FIG. 7E shows the output of lamp 100.

Time points T1-T5 in FIGS. 7A-7E are explained as follows.

T1: AC input power is applied to the ballast.
T2: DC filter bulk capacitor 306 becomes charged up as shown in FIG. 7B and the ballast begins to drive the lamp.
T3: This time point is related to the following time point T4, which collectively constitutes a toggling of a switch (not shown) in reset circuit 802 (FIG. 5). At time point T3, the reset signal shown in FIG. 7D and provided by reset circuit 802 to the reset transistor 828 causes frequency divider 802 to stop counting. Shutoff of square wave oscillator 400 is disabled.
T4: At time point T4, the reset signal provided by reset circuit 860 (FIG. 5) is toggled back to high. This causes frequency divider 802 to reset to zero and begin its counting sequence anew. Shutoff of square wave oscillator 400 (FIG. 5) is re-enabled to become active when the frequency divider reaches the end of a predetermined duration
T5: This is the shutoff point based on initial activation of frequency divider 802. However, since the frequency divider was reset by reset circuit 860, at times T3 and T4, nothing happens to the frequency divider at this time point and no change in output is shown in FIG. 7C.
T6: Frequency divider 802 reaches is predetermined shutoff point based on the new reset signal provided at time point T4. The frequency divider applies a shutdown signal as shown in FIG. 7C, via output Q24, to the ballast, and the lamp is turned off as shown in FIG. 7E. The output of frequency divider 802 remains high, as shown in FIG. 7C, in order to keep the lamp off and disable the frequency divider from preventing any further counter of its internal timer clock. As can be seen from a comparison with FIG. 6E, FIG. 7E shows a duration 852 of the lamp being on that exceeds duration 850 shown in FIG. 6E. So, the lamp can be left on longer using the reset circuit 860 of FIG. 5.
T7: The lamp can be restarted either by cycling of the AC input power—e.g., turning the power switch to the lamp off and on—or by cycling of the reset signal as described in connection with time points T3 and T4.

Figure 8:
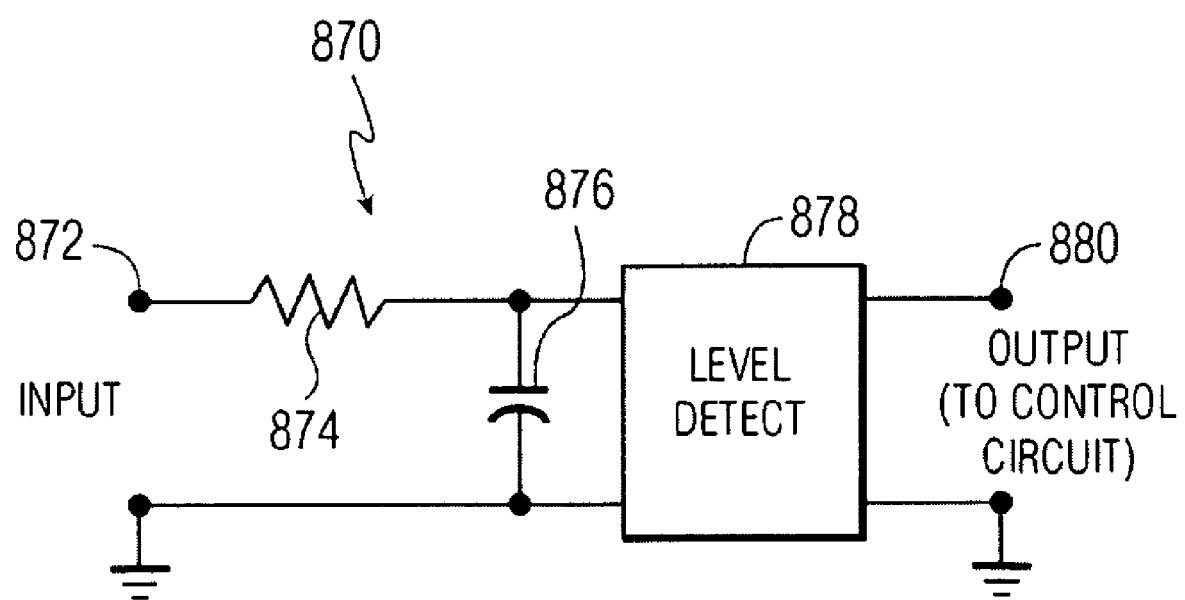
FIG. 8 is a schematic diagram, partially in block form, of an alternative time delay network.

FIG. 8 shows a resistive-capacitive (RC) time delay network 870 differing from time delay network shown in FIG. 5. In FIG. 8, an input node 872 receives a signal to start timing for a predetermined duration. Such a signal could come from filtered power lead 212 or reset circuit 860 in FIG. 5, for instance. The signal on input node 872 causes a current through resistor 874 to charge a capacitor 876. A level detect circuit 878 detects when capacitor 876 has charged to a threshold level, which corresponds to elapse of a predetermined period of time such as 10 hours. An output 880 from time delay network 870 is then applied to either fault logic circuit 650 or oscillator control circuit 450, which are shown in block in FIG. 4.

In the following list of reference numerals and associated parts, exemplary values or descriptions for various parts are placed in parenthesis after the part name:
100. Fluorescent lamp
200. AC input power
202. Nodes
210. Filter Inductor
212. Filtered Power Lead 300. Rectifier and filter circuit
302. PN diode (rectifier 1N4007)
304. PN diode (rectifier 1N4007)
306. PN diode (rectifier 1N4007)
308. PN diode (rectifier 1N4007)
310. Bulk filter capacitor (33 uF, 200V, aluminum electrolytic)
400. Square wave oscillator
402. NPN switching transistor (BUL128)
404. NPN switching transistor (BUL128)
406. Midpoint connection
410. Shutdown SCR (XL0840)
450. Oscillator control and drive circuit
452. Base node
454. Base node
456. Resistor (3.3 ohm, ¼W, metal film)
458. Resistor (3.3 ohm, ¼W, metal film)
460. Integrated Circuit
500. Resonant tank
502. DC blocking capacitor (0.47 uF, 250V, metallized polyester)
504. Resonant inductor (1.2 mH)
506. Base drive winding
508. Base drive winding
510. Resonant capacitor (15 nF, 1000V, metallized polypropylene)
600. Oscillator fault detector circuit
625. Lamp fault detector circuit
626. Sense resistor (0.68 ohms, ½W, metal film)
628. Diode (switching, 1N4148)
630. Resistor (470 k ohms, ⅛W)
632. Capacitor (470 uF, 10V, aluminum electrolytic)
634. Resistor (220 k ohms, ⅛W)
636. Diode (rectifier, 1N4936)
638. Resistor (100 ohms, ¼W)
650. Fault logic circuit
700. Lamp ballast
750. Mechanical or electrical timer
800. Time delay network
802. Frequency divider (MC14521B)
804. Resistor (210 k ohms, ⅛W)
806. Resistor (105 k ohms, ⅛W)
808. Capacitor (22 nF, NPO ceramic)
810. Resistor (510 k ohms, ⅛W)
812. Resistor (200 k ohms, ½W)
820. Transistor (2N2222)
822. Resistor (5.1 k ohms, ⅛W)
824. Common node or tap
828. Reset transistor (N2222)
850. Time interval
860. Reset circuit
855. Reset signal
862. Node
864. Diode (rectifier, 1N4007)
870. Time delay network
872. Input node
874. Resistor
876. Capacitor
878. Level detect circuit
880. Output
900. Printed-circuit board
Part numbers mentioned in the foregoing list are standard part number typically used by multiple manufactures in the United States. Practice of the invention will be routine to a person of ordinary skill in the art based on the foregoing component values and remainder of this description.

The foregoing describes an electronic fluorescent lamp ballast that achieves a timer function, as described herein, while typically only marginally increasing ballast cost and ballast size.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A gas discharge lamp ballast with an integral shutdown timer, the ballast comprising:
    a) a circuit for receiving AC power;
    b) a converter circuit for converting the AC power to DC power;
    c) a square wave oscillator powered from the DC power;
    d) a resonant circuit powered by the square wave oscillator for supplying power to at least one gas discharge lamp; and
    e) a time-delay circuit configured to disable the square wave oscillator, without interrupting the DC power supplied to the oscillator, upon the passage of a predetermined period of time from power-up of the AC power.

2. The ballast of claim 1, wherein:
    a) the converter circuit is configured such that, upon AC power-down, DC power remains available for some time after AC power-down; and
    b) the time-delay circuit has an on mode when adequate power is supplied to a power input node of the time-delay circuit; the time-delay circuit including, in the on mode of the time-delay circuit
        i) an output node selectively having a shutdown output voltage for disabling the square wave oscillator, or a neutral output voltage that does not disable the square wave oscillator;
        ii) a reset input node for causing the output node to have a neutral output voltage when a reset voltage is applied to the reset input node;
        iii) the reset voltage being generated in response to power-down of the AC power without a delay that would be present if the reset voltage were generated in response to power-down of the DC power; and
        iv) power to the power input node being supplied from said DC power, so that the time-delay circuit reliably remains in the on mode when the reset voltage is applied to the reset input node.

3. The ballast of claim 1, wherein:
    a) the time-delay circuit comprises a resistive-capacitive circuit whose resistive and capacitance values determine a part or all of said predetermined period of time when said resistive-capacitive circuit is enabled;
    b) the time-delay circuit generates a shut-down signal for shutting down the square wave oscillator upon elapse of said predetermined period of time; and
    c) the resistive-capacitive circuit is disabled upon elapse of said predetermined period of time.

4. The ballast of claim 1, wherein the time-delay circuit comprises:
    a) a timing oscillator establishing a first period of time; and
    b) a frequency divider responsive to the timing oscillator for dividing the frequency corresponding to the first period of time into a frequency corresponding to a second period of time;
    c) the predetermined period of time being the same or greater than the second period of time.

5. The ballast of claim 4, wherein the timing oscillator comprises a resistive-capacitive circuit whose resistive and capacitance values determine the first period of time.

6. The ballast of claim 1, wherein:
   a) the time-delay circuit comprises a resistive-capacitive circuit whose resistive and capacitive values determine a part of all of said predetermined period of time when voltage is applied to said resistive-capacitive circuit;
   b) a first period of time being determined by the time required for capacitance of the resistive-capacitive circuit to reach a threshold level; the predetermined period of time being the same or greater than the first period of time.

7. The ballast of claim 1, wherein the time-delay circuit has an on mode when adequate power is supplied to a power input node of the time-delay circuit; the time-delay circuit including, in the on mode of the time-delay circuit:
   a) an output node selectively having a shutdown output voltage for disabling the square wave oscillator, or a neutral output voltage that does not disable the square wave oscillator;
   b) a reset input node for causing the output node to have a neutral output voltage when a reset voltage is applied to the reset input node;
   c) the reset voltage being generated, not in response to AC voltage in said circuit for receiving AC power, but in response to a reset-voltage generating circuit that is responsive to a manual reset indication from a user.

8. The ballast of claim 1, wherein the predetermined period of time is greater than 15 minutes.

9. The ballast of claim 1, wherein:
   a) the ballast includes a fault-detection circuit configured to shut down the square wave oscillator in the presence of a fault; and
   b) the time-delay network shuts down the square wave oscillator via the fault-detection circuit.

10. The ballast of claim 1, wherein the square wave oscillator is controlled by an oscillator control and drive circuit comprising an integrated control circuit.

11. The ballast of claim 10, wherein the square wave oscillator comprises a pair of transistors serially connected to each other at a common node; the common node being alternately connected to a DC voltage or to an associated reference voltage by alternate switching on of the transistors; the transistors each having a control node.

12. The ballast of claim 1, wherein all mentioned circuits are mounted directly or indirectly on the same printed-circuit board.

13. A gas discharge lamp ballast with an integral shutdown timer, comprising:
   a) a circuit for receiving AC power;
   b) a converter circuit for converting the AC power to DC power; the converter circuit being configured such that, upon AC power-down, DC power remains available for some time after AC power-down;
   c) a self-resonant square wave oscillator powered from the DC power; the square wave oscillator comprising a pair of transistors serially connected to each other at a common node; the common node being alternately connected to a DC voltage or to an associated reference voltage by alternate switching on of the transistors; the transistors each having a control node;
   d) a resonant circuit powered by the square wave oscillator for supplying power to at least one gas discharge lamp; and
   e) a time-delay circuit configured to disable one of said transistors of the square wave oscillator, without interrupting the DC power supplied to the oscillator, upon the passage of a predetermined period of time from power-up of the AC power; said disabling occurring by clamping the control node of said one of said transistors to a value that prevents switching on of said transistor.

14. The ballast of claim 13, wherein the time-delay circuit has an on mode when adequate power is supplied to a power input node of the time-delay circuit; the time-delay circuit including, in the on mode of the time-delay circuit:
   a) an output node selectively having a shutdown output voltage for disabling the square wave oscillator, or a neutral output voltage that does not disable the square wave oscillator;
   b) a reset input node for causing the output node to have a neutral output voltage when a reset voltage is applied to the reset input node;
   c) the reset voltage being generated in response to power-down of the AC power without a delay that would be present if the reset voltage were generated in response to power-down of the DC power; and
   d) power to the power input node being supplied from said DC power, so that the time-delay circuit reliably remains in the on mode when the reset voltage is applied to the reset input node.

15. The ballast of claim 13, wherein:
   a) the time-delay circuit comprises a resistive-capacitive circuit whose resistive and capacitance values determine a part or all of said predetermined period of time when said resistive-capacitive circuit is enabled;
   b) the time-delay circuit generates a shut-down signal for shutting down the square wave oscillator upon elapse of said predetermined period of time; and
   c) the resistive-capacitive circuit is disabled upon elapse of said predetermined period of time.

16. The ballast of claim 13, wherein the time-delay circuit comprises:
   a) a timing oscillator establishing a first period of time; and
   b) a frequency divider responsive to the timing oscillator for dividing the frequency corresponding to the first period of time into a frequency corresponding to a second period of time;
   c) the predetermined period of time being the same or greater than the second period of time.

17. The ballast of claim 16, wherein the timing oscillator comprises a resistive-capacitive circuit whose resistive and capacitance values determine the first period of time.

18. The ballast of claim 13, wherein:
   a) the time-delay circuit comprises a resistive-capacitive circuit whose resistive and capacitive values determine a part of all of said predetermined period of time when voltage is applied to said resistive-capacitive circuit;
   b) a first period of time being determined by the time required for capacitance of the resistive-capacitive circuit to reach a threshold level; the predetermined period of time being the same or greater than the first period of time.

19. The ballast of claim 13, wherein the time-delay circuit has an on mode when adequate power is supplied to a power input node of the time-delay circuit; the time-delay circuit including, in the on mode of the time-delay circuit:
   a) an output node selectively having a shutdown output voltage for disabling the square wave oscillator, or a neutral output voltage that does not disable the square wave oscillator;
   b) a reset input node for causing the output node to have a neutral output voltage when a reset voltage is applied to the reset input node;

c) the reset voltage being generated, not in response to AC voltage in said circuit for receiving AC power, but in response to a reset-voltage generating circuit that is responsive to a manual reset indication from a user.

20. The ballast of claim 13, wherein the predetermined period of time is greater than 15 minutes.

21. The ballast of claim 13, wherein:
a) the ballast includes a fault-detection circuit configured to shut down the square wave oscillator in the presence of a fault; and
b) the time-delay network shuts down the square wave oscillator via the fault-detection circuit.

22. The ballast of claim 13, wherein all mentioned circuits are mounted directly or indirectly on the same printed-circuit board.

* * * * *

UNITED STATES PATENT AND TRADEMARK OFFICE
CERTIFICATE OF CORRECTION

| | | |
|---|---|---|
| PATENT NO. | : 8,004,217 B2 | Page 1 of 1 |
| APPLICATION NO. | : 12/013247 | |
| DATED | : August 23, 2011 | |
| INVENTOR(S) | : George William Mortimer and Robert William Wisbey | |

It is certified that error appears in the above-identified patent and that said Letters Patent is hereby corrected as shown below:

Column 8, line 33, in claim 2, after "circuit" insert -- : --

Signed and Sealed this
Twenty-fifth Day of October, 2011

David J. Kappos
*Director of the United States Patent and Trademark Office*